(12) United States Patent
Lev et al.

(10) Patent No.: US 12,198,375 B2
(45) Date of Patent: Jan. 14, 2025

(54) IMAGE ANALYSIS FOR CONTROLLING MOVEMENT OF AN OBJECT

(71) Applicant: NEC Corporation Of America, Herzlia (IL)

(72) Inventors: Tsvi Lev, Tel-Aviv (IL); Hagai Har-Gil, Ramat Gan (IL)

(73) Assignee: NEC Corporation Of America, Herzlia (IL)

( * ) Notice: Subject to any disclaimer, the term of this patent is extended or adjusted under 35 U.S.C. 154(b) by 268 days.

(21) Appl. No.: 17/872,067

(22) Filed: Jul. 25, 2022

(65) Prior Publication Data

US 2023/0290000 A1 Sep. 14, 2023

Related U.S. Application Data

(63) Continuation-in-part of application No. 17/689,109, filed on Mar. 8, 2022.

(51) Int. Cl.
*G06T 7/73* (2017.01)
*G05D 1/00* (2006.01)
*G06T 7/33* (2017.01)

(52) U.S. Cl.
CPC ............. *G06T 7/74* (2017.01); *G05D 1/0242* (2013.01); *G05D 1/0253* (2013.01); *G06T 7/337* (2017.01); *G06T 2207/30252* (2013.01)

(58) Field of Classification Search
CPC .......... G06T 7/74; G06T 7/337; G05D 1/0242
See application file for complete search history.

(56) References Cited

U.S. PATENT DOCUMENTS

| 5,835,271 A | 11/1998 | Stump et al. |
| 6,215,519 B1 | 4/2001 | Nayar et al. |
| 9,196,056 B2 | 11/2015 | Hall |
| 10,298,908 B2 * | 5/2019 | Retterath ............. G01S 17/894 |
| 10,972,655 B1 | 4/2021 | Ostap et al. |
| 11,117,570 B1 * | 9/2021 | Broggi ................. G06V 20/586 |
| 11,436,752 B1 * | 9/2022 | Rublee ..................... G06T 7/70 |

(Continued)

FOREIGN PATENT DOCUMENTS

| CA | 2729712 | 12/2009 |
| EP | 3547277 | 10/2019 |

(Continued)

OTHER PUBLICATIONS

Notice of Allowance Dated May 22, 2024 from the US Patent and Trademark Office Re. U.S. Appl. No. 17/689,109. (19 Pages).

(Continued)

*Primary Examiner* — Hugh Maupin

(57) ABSTRACT

There is provided a computer implemented method of controlling movement of an object, comprising: accessing a current image of a surface relative to an object at a current location, wherein an imaging sensor is set to capture the current image depicting an overlap with a previously captured image of the surface when the object was at a previous location, registering the current image to the overlap of the previously captured image, computing the current location of the object relative to a reference location according to an analysis of the registration, and feeding the current location into a controller for controlling movement of the object.

17 Claims, 9 Drawing Sheets

(56) References Cited

U.S. PATENT DOCUMENTS

| | | |
|---|---|---|
| 2005/0185279 A1 | 8/2005 | Mullen et al. |
| 2005/0278098 A1* | 12/2005 | Breed .................. G01S 7/0234 |
| | | 701/45 |
| 2008/0212182 A1 | 9/2008 | Nilsen |
| 2009/0190237 A1 | 7/2009 | Silverstein et al. |
| 2010/0322471 A1 | 12/2010 | Trcado et al. |
| 2014/0129073 A1* | 5/2014 | Ferguson ........ B60W 30/18163 |
| | | 701/23 |
| 2015/0288948 A1* | 10/2015 | Schamp .................. H04N 5/33 |
| | | 348/47 |
| 2016/0086018 A1 | 3/2016 | Lemoff |
| 2017/0059398 A1 | 3/2017 | Tennant et al. |
| 2017/0191822 A1* | 7/2017 | Becker ..................... G06T 7/33 |
| 2017/0270375 A1* | 9/2017 | Grauer .................. G06V 10/60 |
| 2017/0328729 A1* | 11/2017 | Zhu ...................... G05D 1/0238 |
| 2017/0363887 A1* | 12/2017 | Uyeno .................. G02F 1/3501 |
| 2018/0081094 A1 | 3/2018 | Aikin et al. |
| 2019/0095721 A1 | 3/2019 | Ion et al. |
| 2019/0120967 A1* | 4/2019 | Smits ................ G01C 21/3626 |
| 2020/0255030 A1* | 8/2020 | Yamamoto ............ G01S 17/931 |
| 2020/0274998 A1* | 8/2020 | Herman .................. H04N 23/74 |
| 2020/0309688 A1 | 10/2020 | Park et al. |
| 2021/0190962 A1* | 6/2021 | Maimon .................. H04N 5/33 |
| 2021/0199769 A1* | 7/2021 | Meylan ................ G01S 7/4811 |
| 2021/0275084 A1 | 9/2021 | Tversky |
| 2021/0323556 A1* | 10/2021 | Matsumura ....... B60W 60/0015 |
| 2022/0003665 A1 | 1/2022 | Swenson et al. |
| 2022/0057519 A1 | 2/2022 | Goldstein et al. |
| 2022/0095923 A1 | 3/2022 | Seybold et al. |
| 2022/0137218 A1 | 5/2022 | Onal et al. |
| 2023/0247313 A1 | 8/2023 | Paris et al. |
| 2023/0288618 A1 | 9/2023 | Lev et al. |
| 2023/0290181 A1 | 9/2023 | Lieber et al. |
| 2023/0292013 A1 | 9/2023 | Lieber et al. |
| 2023/0292015 A1 | 9/2023 | Hoch |
| 2023/0326253 A1 | 10/2023 | Shishido et al. |

FOREIGN PATENT DOCUMENTS

| | | |
|---|---|---|
| ES | 2554549 | 12/2015 |
| SG | 191452 | 7/2013 |
| WO | WO 2008/129552 | 10/2008 |
| WO | WO 2011/101856 | 8/2011 |

OTHER PUBLICATIONS

Official Action Dated May 21, 2024 From the US Patent and Trademark Office Re. U.S. Appl. No. 17/851,099. (34 Pages).

Notice of Allowance Dated May 1, 2024 from the US Patent and Trademark Office Re. U.S. Appl. No. 17/741,476. (11 pages).

Official Action Dated Feb. 13, 2024 from the US Patent and Trademark Office Re. U.S. Appl. No. 17/689,109. (27 pages).

Minaee et al. "Deep-Emotion: Facial Expression Recognition Using Attentional Convolutional Network", ArXiv Preprint ArXiv:1902.01019v1, p. 1-8, Feb. 4, 2019.

Official Action Dated Apr. 3, 2024 from the US Patent and Trademark Office Re. U.S. Appl. No. 17/741,476. (26 pages).

Steiner et al. "Design of an Active Multispectral SWIR Camera System for Skin Detection and Face Verification", Safety and Security Research Institute (ISF), Bonn-Rhein-Sieg University of Applied Sciences, Grantham-Allee 20, 53757 Sankt Augustin, Germany, Hindawi Publishing Corporation, vol. 2016 | Article ID 9682453, 1-16, Nov. 16, 2015.

Official Action Dated Jan. 30, 2024 From the US Patent and Trademark Office Re. U.S. Appl. No. 17/872,086. (16 Pages).

Notice of Allowance Dated Jun. 20, 2024 From the US Patent and Trademark Office Re. U.S. Appl. No. 17/872,086. (13 Pages).

Notice of Allowance Dated Aug. 23, 2024 from the US Patent and Trademark Office Re. U.S. Appl. No. 17/851,099. (20 pages).

* cited by examiner

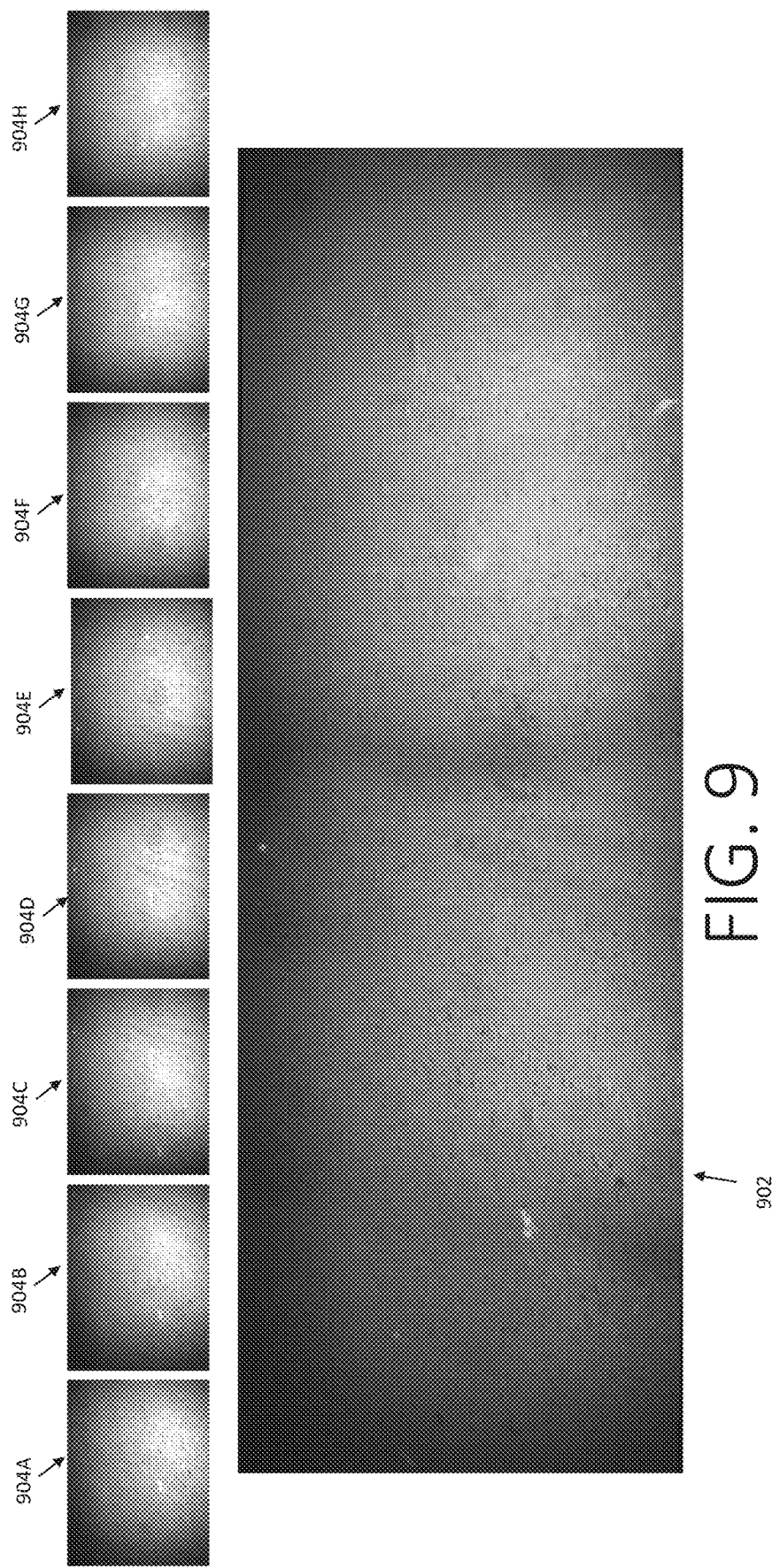

IMAGE ANALYSIS FOR CONTROLLING MOVEMENT OF AN OBJECT

RELATED APPLICATION(S)

This application is a Continuation-In-Part (CIP) of U.S. patent application Ser. No. 17/689,109 filed on Mar. 8, 2022, the contents of which are all incorporated by reference as if fully set forth herein in their entirety.

FIELD AND BACKGROUND OF THE INVENTION

The present invention, in some embodiments thereof, relates to systems and methods for localization of an object and, more specifically, but not exclusively, to systems and methods for controlling movement of an object based on a location of the object determined from an analysis of images.

Standard localization approaches include, for example, analyzing an image to determine a famous landmark such as the Statue of Liberty and determining the location as Liberty Island, or using a location sensor such as a global positioning sensor to obtain coordinates of a current location.

SUMMARY OF THE INVENTION

According to a first aspect, a computer implemented method of controlling movement of an object, comprises: accessing a current image of a surface relative to an object at a current location, wherein an imaging sensor is set to capture the current image depicting an overlap with a previously captured image of the surface when the object was at a previous location, registering the current image to the overlap of the previously captured image, computing the current location of the object relative to a reference location according to an analysis of the registration, and feeding the current location into a controller for controlling movement of the object.

According to a second aspect, a system for controlling movement of an object, comprises: at least one processor executing a code for: accessing a current image of a surface relative to an object at a current location, wherein an imaging sensor is set to capture the current image depicting an overlap with a previously captured image of the surface when the object was at a previous location, registering the current image to the overlap of the previously captured image, computing the current location of the object relative to a reference location according to an analysis of the registration, and feeding the current location into a controller for controlling movement of the object.

According to a third aspect, a non-transitory medium storing program instructions for controlling movement of an object, which, when executed by at least one processor, cause the at least one processor to: access a current image of a surface relative to an object at a current location, wherein an imaging sensor is set to capture the current image depicting an overlap with a previously captured image of the surface when the object was at a previous location, register the current image to the overlap of the previously captured image, compute the current location of the object relative to a reference location according to an analysis of the registration, and feed the current location into a controller for controlling movement of the object.

In a further implementation form of the first, second, and third aspects, the object is selected from a group comprising: a vehicle, a robot, an autonomous car, and a drone.

In a further implementation form of the first, second, and third aspects, further comprising activating an electromagnetic illumination source at a selected illumination pattern for generating electromagnetic illumination for providing visibility of the surface depicted in images, wherein the images are captured by an imaging sensor at the electromagnetic spectrum of the electromagnetic illumination.

In a further implementation form of the first, second, and third aspects, the electromagnetic illumination source generates electromagnetic illumination at the short wave infrared (SWIR) range, and the imaging sensor comprises a SWIR sensor.

In a further implementation form of the first, second, and third aspects, the SWIR range comprises a solar blind range.

In a further implementation form of the first, second, and third aspects, the current location is computed according to a conversion between pixels of the registered images and physical distances based on parameters of the imaging sensor.

In a further implementation form of the first, second, and third aspects, registering comprises extracting a current spatial pattern of a plurality of keypoint features from the current image, and matching the current spatial pattern to a previously extracted spatial pattern of a plurality of keypoint features extracted from the previously captured image.

In a further implementation form of the first, second, and third aspects, the plurality of keypoint features are non-encoding features that are textural features of the surface.

In a further implementation form of the first, second, and third aspects, the textural features are of a surface selected from a group comprising: asphalt, concrete, marble, wood, earth, and rough paint.

In a further implementation form of the first, second, and third aspects, the plurality of keypoint features are randomly arranged.

In a further implementation form of the first, second, and third aspects, the plurality of keypoint features are similar to one another.

In a further implementation form of the first, second, and third aspects, the plurality of keypoint features are less than about 10 millimeters in length or diameter.

In a further implementation form of the first, second, and third aspects, registering further comprising computing a difference between the current image registered to the previous image, and defining the registration when the difference is below a threshold indicating likelihood of a match, wherein the threshold is selected to account for temporary objects occluding the surface.

In a further implementation form of the first, second, and third aspects, further comprising computing a transformation between the current image and the previous image, wherein the location is computed based on the transformation and location and/or orientation of the imaging sensor.

In a further implementation form of the first, second, and third aspects, the imaging sensor is installed on the object and set for capturing images of the surface over which the object is moving.

In a further implementation form of the first, second, and third aspects, the accessing, the registering, the computing, and the feeding, are iterated dynamically while the object is in motion over a plurality of time intervals using subsequently obtained new current images using preceding obtained images.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 9 is a schematic depicting an image of a road created by stitching sequentially captured images, in accordance with some embodiments of the present invention.

DESCRIPTION OF SPECIFIC EMBODIMENTS OF THE INVENTION

Figure 1:
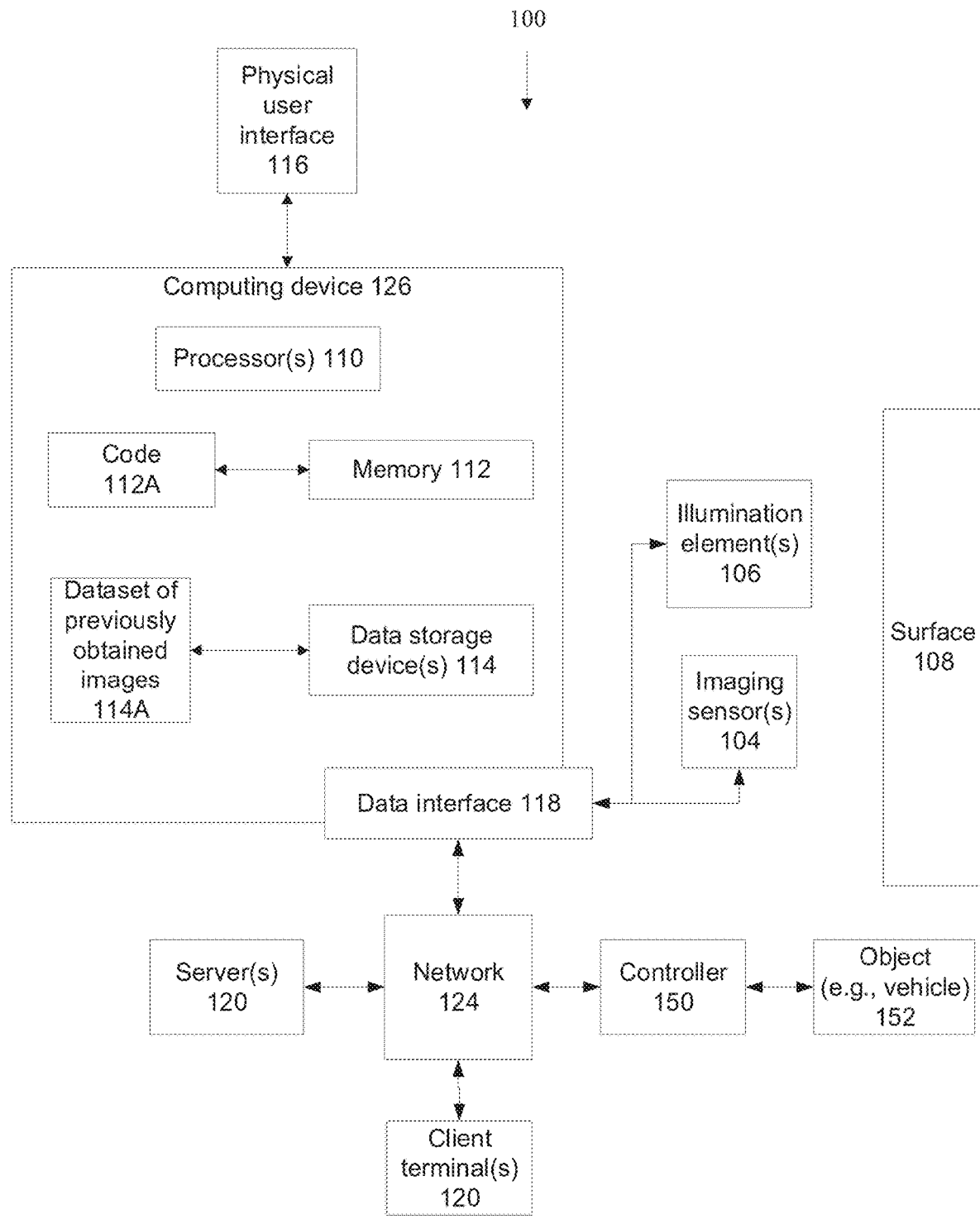
FIG. 1 is a schematic of a block diagram of components of a system for computing a location of an object based on an analysis of registered overlapping sequentially captured images of a surface, in accordance with some embodiments of the present invention.

The present invention, in some embodiments thereof, relates to systems and methods for localization of an object and, more specifically, but not exclusively, to systems and methods for controlling movement of an object based on a location of the object determined from an analysis of images.

An aspect of some embodiments of the present invention relates to systems, methods, computing devices, and/or code instructions (stored on a memory and executable by one or more hardware processors) for computing a location of an object, optionally a moving object, optionally for controlling movement of the object. The object may be, for example, a robot, a drone, and/or a vehicle, such as a car (e.g., autonomous, semi-autonomous), a motorcycle, and the like. An imaging sensor installed on the object is set to capture sequential images of a surface that overlap with one another. A currently captured image depicting the surface relative to the object at a current location of the object is obtained from the imaging sensor. The current image is registered to the overlapping portion of a previously captured image captured when the object was previously at a different previous location. The registration may be performed by sequentially stitching the sequentially captured images. For example, overlapping images are captured of a road or ground while the object is moving relative to the road or ground. The current location of the object is computed relative to a reference location according to an analysis of the registration. For example, a zero coordinate is set within a first image. The current location of the object is computed by determining the overlapping registered region between the first image and a second image, which defines the direction of movement of the object relative to the zero coordinate. The current location is provided, optionally by feeding the current location into a controller for controlling movement of the object, for example, for navigation of the object along the surface.

At least some implementations of the systems, methods, computing devices, and/or code instructions described herein address the technical problem and/or improve the technical field and/or improve upon prior approaches, of controlling movement of an object (e.g., navigation), optionally in view of one or more of:

With high accuracy and/or resolution of the movement, for example, automatic parking in a parking lot, and a vacuum cleaning robot that is programmed to clean all floor surfaces in an office. The accuracy and/or resolution of the location of the object computed using embodiments described herein may be much higher than accuracy and/or resolution of location of the object computed using standard positioning systems such as global positioning system (GPS).

When no standard positioning system are available, for example, GPS, and/or triangulation of location using feedback from cellular communication towers is available. Such standard systems may not be installed on the object. Such systems may not be operable, for example, in underground parking lots, and/or high up in office towers, and/or on a moving boat.

During real time motion of the object. Some standard approaches are designed for computing location of a stationary object, and do not perform well for computing real time location during motion of the object.

As an add-on to an object. Embodiments described herein may be installed on existing objects, by installing at least one imaging sensor and storing code on a memory for execution by one or more processors. Almost any object capable of movement may be provided with real time location, even living objects such as a horse, a cow, and a dog.

Previous knowledge of the environment is not required. Previous mapping of the environment, such as using a map of the terrain (e.g., city streets) is not required, since embodiments described herein may rely entirely on registration of sequentially captured images, regardless of the surrounding environment and/or terrain.

Identification of unique visual features is not required. Some existing approaches determine location based on identification of unique visual features depicted in the captured image(s), for example, identifying well known landmarks such as the statue of liberty and well known statues at famous sites. Embodiments described herein may compute the location of the object on terrain with randomly distributed non-unique visual features, for example, along non-smooth concrete that has natural bumps, indentations and other visual features, that appear very similar to one another, that formed during pouring and settling of the concrete.

At least some implementations described herein address the above mentioned technical problem, and/or improve the above mentioned field, and/or improve upon existing approaches, by computing a location of an object, optionally dynamically as the object is moving, according to an analysis of registration of sequentially captured images depicting a surface relative to which the object is moving.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
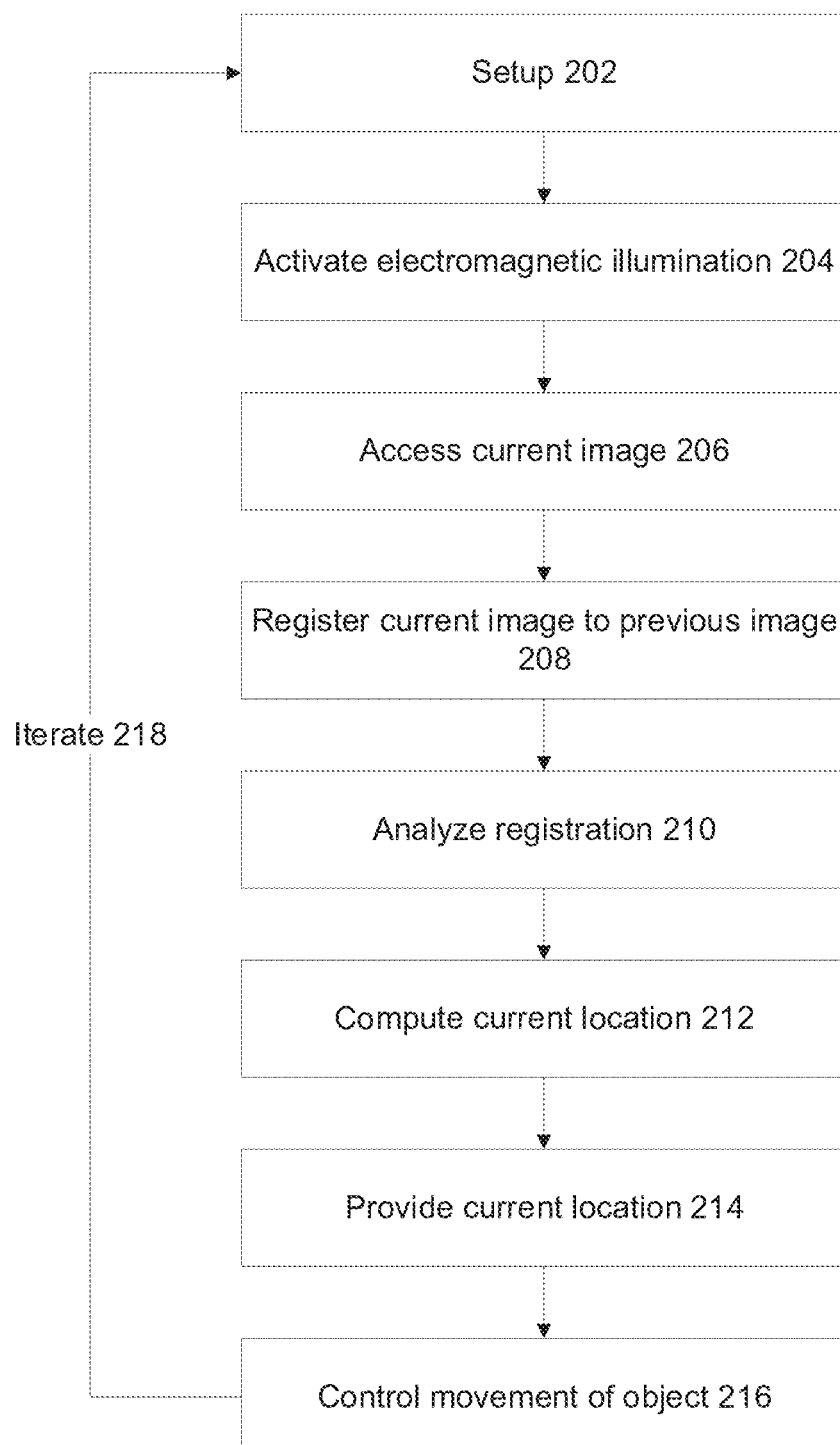
FIG. 2 is a flowchart of a method for computing a location of an object based on an analysis of registered overlapping sequentially captured images of a surface, in accordance with some embodiments of the present invention.

Reference is now made to FIG. 1, which is a schematic of a block diagram of components of a system 100 for computing a location of an object 152 based on an analysis of registered overlapping sequentially captured images of a surface 108, in accordance with some embodiments of the present invention. Reference is also made to FIG. 2, which is a flowchart of a method for computing a location of an object based on an analysis of registered overlapping sequentially captured images of a surface, in accordance with some embodiments of the present invention. System 100 may implement the acts of the method described with reference to FIG. 2, by processor(s) 110 of a computing device 126 executing code instructions (e.g., code 112A) stored on a memory 112.

Object 152 may be, for example, a robot, a drone, and/or a vehicle, such as a car (e.g., autonomous, semi-autonomous), a motorcycle, a wheelchair, or even a living animal such as a horse or cow, and the like.

Object 152 may be in communication with a controller 150 that receives the computed location of object 152. Controller 150 may, for example, generate instructions for automated movement and/or navigation of object 152 according to the computed location.

Object 152 may move parallel to surface 108, for example, moving along and/or in parallel to surface 108.

Surface 108 may be, for example, concrete, asphalt, wood, marble, applied paint, earth, a wall, a highway barrier, and the like.

System 100 may include one or more imaging sensors 104 for capturing one or more images of surface 108. Imaging sensor(s) 104 capture images at certain wavelengths, for example, one or more ranges within the visible light spectrum, ultraviolet (UV), infrared (IR), near infrared (NIR), and the like. Examples of imaging sensor(s) 104 include a camera and/or video camera, such as CCD, CMOS, and the like. Imaging sensor(s) 104 may be implemented as, for example, a short wave infrared (SWIR) sensor that captures SWIR image(s) of surface 108 at a SWIR wavelength, optionally including a solar blind range. Examples of SWIR sensor(s) 104 include: Plasmon based CMOR, balometer array based FIR, and 3D passive imaging.

As used herein, the term "solar blind range" refers to the wavelength spectrum at which electromagnetic radiation (e.g., generated by sunlight and/or artificial light sources) is highly (e.g., mostly) absorbed in the atmosphere (e.g., by water vapor in air) and/or has low emission for example, the range of about 1350-1450 nm, optionally 1360-1380 nm. Additional details of the solar blind range and SWIR sensor (s) for capturing image at the solar blind range are described herein and/or with reference to U.S. patent application Ser. No. 17/689,109 filed on Mar. 8, 2022, by at least one common inventor of the instant application, the contents of which are incorporated herein by reference in their entirety.

Optionally, system 100 may include one or more illumination elements 106 that generate electromagnetic illumination at a selected electromagnetic frequency range that is captured by imaging sensor(s) 104, for example, SWIR illumination optionally at the solar blind range, one or more ranges within the visible light spectrum (e.g., white or one or more colors), ultraviolet (UV), infrared (IR), near infrared (NIR), and the like.

System 100 includes a computing device 126, for example one or more and/or combination of: a group of connected devices, a client terminal, a vehicle electronic control unit (ECU), a server, a computing cloud, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

System 100 and/or computing device 126 include one or more processor(s) 110, which may interface with imaging sensor(s) 104 for receiving image(s) of surface 108. Processor(s) 110 may interface with other components, described herein. Processor(s) 110 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

System 100 and/or computing device 126 include a memory 112, which stores code 112A for execution by processor(s) 110. Code 112A may include program instructions for implementing one or more features of the method described with reference to FIG. 2, as described herein. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

System 100 and/or computing device 126 include a data storage device(s) 114, which may store data, for example, a dataset of previously images 114A of surface 108, as described herein. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

System 100 and/or computing device 126 may include a physical user interface 116 that includes a mechanism for user interaction, for example, to enter data and/or to view data. Exemplary physical user interfaces 116 include, for example, one or more of, a touchscreen, a display, gesture activation devices, a keyboard, a mouse, and voice activated software using speakers and microphone.

System 100 and/or computing device 126 may include a data interface 118 for providing communication with controller 150 and/or other external devices (e.g., server(s) 120 and/or client terminal(s) 122) optionally over a network 124, for example, for receiving images of surface 108 and/or providing the determined location of object 152. Data interface 118 may be implemented as, for example, one or more of, a network interface, a vehicle data interface, a USB port, a network interface card, an antenna, a wireless interface to connect to a wireless network, a short range wireless connection, a physical interface for connecting to a cable for network connectivity, a virtual interface implemented in software, network communication software providing higher layers of network connectivity, and/or other implementations.

Computing device 126 may interface with other components using data interface 118, for example, with illumination element 106 (e.g., for controlling an illumination pattern) and/or with imaging sensor 104.

Network 124 may be implemented as, for example, a vehicle network, the internet, a broadcast network, a local area network, a virtual network, a wireless network, a cellular network, a local bus, a point to point link (e.g., wired), and/or combinations of the aforementioned. It is noted that a cable connecting processor(s) 110 and another device may be referred to herein as network 124.

Vehicle controller 150 is in communication with vehicle 152, and computes instructions for navigation of the vehicle based on the computed location.

Server(s) 120 and/or client terminal(s) 122 may be implemented as, for example, remote devices for monitoring locations of one or more objects, and/or for remote navigation of the objects according to the computed locations.

System 100 may be implemented as different architectures. For example, in a server-client architecture, computing device 126 is implemented as a server that receives images of surface 108 captured by imaging sensor 104 from a client terminal over network 124. Computing device 126 computes the location as described herein, and provides the location, for example, to client terminal 122. In another local example, computing device 126 is implemented as a local computer that receives images of surface 108 captured by imaging sensor 104 and locally computes the location as described herein, and provides the location. For example, computing device 126 is located as software and/or hardware installed in a vehicle for on-board imaging and control of the vehicle.

Referring now back to FIG. 2, at 202, components of the system described with reference to FIG. 1 may be setup on the object.

The object may be, for example, a vehicle, a robot, an autonomous car (e.g., fully automatic, semi-automatic), a drone, or even a living animal such as a horse or cow.

Components of the system may be installed as an add-on to provide dynamic real time localization of the object during motion. For example, imaging sensors are installed on the object, and/or images captures by existing imaging sensors of the object are accessed. Code and/or processors for processing the images and/or computing the location may be installed in association with existing data storage device(s) and/or data storage device(s) storing the code and/or processor(s) may be installed in the vehicle. The add-on component may be implemented as, for example, a vehicle electronic control unit (ECU) that is connected to the vehicle network, and/or an external camera and smartphone storing the code that is independent of the object and/or connected to the vehicle network.

The imaging sensor is set to dynamically capture overlapping images during motion of the object. Each image depicts a surface relative to the motion of the vehicle, for example, the imaging sensor is placed facing downwards for capturing images depicting the surface along which the vehicle is moving (e.g., concrete, asphalt, wood, ceramic tiles, earth), and/or the imaging sensor is placed facing towards a side of the vehicle (e.g., left or right) for capturing images depicting a barrier next to the moving vehicle, such as a wall, or highway divider. The image sensor iteratively captures a current image depicting the surface at the current location of the vehicle, where the current image overlaps with a previously captured image of the surface when the object was at a previous location relative to the surface.

At 204, an electromagnetic illumination source may be activated at a selected illumination pattern for generating electromagnetic illumination for providing visibility of the surface depicted in the images. Illumination patterns may be, for example, continuous, strobing, synchronized with capture of the image, and the like. The images are captured by the imaging sensor at the electromagnetic spectrum of the electromagnetic illumination.

The electromagnetic illumination source generating electromagnetic illumination may be, for example, a light source generating light at the visible spectrum, for example, white light, or colored light of one or more colors. The imaging sensor may be, for example, a camera.

The electromagnetic illumination source generating electromagnetic illumination may be, for example, a SWIR illumination element that generates electromagnetic illumination at the SWIR range, optionally in the solar blind range. The imaging sensor may be a SWIR sensor, optionally set for capturing images in the solar blind range.

Optionally, one or more filters are included in the system described with reference to FIG. 1. The filter(s) filter out electromagnetic radiation at wavelengths which are mostly non-absorbed by water vapor in air depicted in the scene. The filter passes electromagnetic radiation at wavelengths which are most absorbed by water vapor in air depicted in the scene. The filter may be a spectral narrow pass-band filter that passes wavelengths of about 1350-1450 nanometers (nm) and excludes wavelengths over about 1450 nm and below about 1350 nm, optionally the filter passes wavelengths of about 1360 nm-1380 nm and excludes wavelengths of over about 1380 nm and under about 1360 nm. The filter generates solar blind images at the solar blind range. The wavelengths in the solar blind range are designed to be emitted by the SWIR illumination element, filtered by the filter, and captured by the SWIR sensor for generating the SWIR image, as described herein. A standard visible light camera (e.g., RGB, CMOS, CCD) located behind the filter generates image of the scene that appear dark. Sunlight is naturally blocked in the wavelength range that is passed by the filter. Artificial light sources do not emit significant amounts of electromagnetic radiation at the wavelength range that is passed by the filter. Such dark images of the scene cannot be used to significantly discern features of objects depicted therein. One or more SWIR sensors capture the SWIR illumination of the SWIR wavelength range, where the SWIR illumination passes through the filter prior to hitting the SWIR sensor. The SWIR images depict the scene independently of the amount of sun and/or artificial light, generating images that are free of glare from the sun, images captured at night in which features of objects may be significantly determined, and/or images that appear similar regardless of the time of day and/or environment (e.g., clouds, sunny, rain, snow, and the like).

It is noted that in some embodiments, the filter may be omitted and/or built in to the SWIR sensors and/or the SWIR illumination element. For example, the SWIR sensor(s) is designed to capture electromagnetic energy having wavelengths in the solar blind range without necessarily requiring a filter, and/or using a built-in filter. In another example, the SWIR illumination element is designed to generate electromagnetic energy having wavelengths in the solar blind range without necessarily requiring a filter, and/or using a built-in filter.

Additional details of the solar blind range and SWIR sensor(s) for capturing image at the solar blind range are described, for example, with reference to U.S. patent application Ser. No. 17/689,109 filed on Mar. 8, 2022, by at least one common inventor of the instant application, the contents of which are incorporated herein by reference in their entirety.

Illumination and/or sensor may be at other electromagnetic frequency ranges, for example, UV, IR, NIR, as described herein.

At 206, a current image depicting the surface relative to the object, at the current location of the object, is accessed.

At 208, the current image is registered to a previously captured image depicting the surface relative to the object at a previous location of the object (i.e., the object has moved from the previous location to the current location). The registration is performed at the overlapping portion of the first and current images.

Registration may be performed by identifying multiple keypoint features of the current image, identifying multiple keypoint features of the previous image, and mapping the two sets of keypoint features. Optionally, the registration is performed by extracting a current spatial pattern of keypoint features from the current image, and matching the current spatial pattern to a previously extracted spatial pattern of keypoint features extracted from the previously captured image. Keypoint features may be identified, for example, using a difference of Gaussian approach, a scale invariant feature transform (SIFT) approach, and the like.

Registration may be performed by stitching the current image and the previous image using an image stitching process, optionally using the identified keypoint features.

The keypoint features may be non-encoding features that are textural features of the surface. The surface may be, for example, asphalt, concrete, marble, wood, earth, and rough paint. The textural features of the surface may be, for example, indentations, elevations, markings, and/or other patterns made by the physical material itself. The keypoint features may be randomly arranged, for example, a result of natural creation of the surface (e.g., growth of a tree from which the wood is cut, formation of the marble), and/or a result of formation of the surface (e.g., pouring of concrete, laying down of asphalt, application of paint). The keypoint features may be similar to one another and/or are not indicative of location by themselves, for example, an indented small line in the concrete is similar to another indented small line in another location in the concrete. The randomness and/or naturally arising formation of the keypoint features may render the keypoint features non-encoding, i.e., the keypoint features cannot be decoded by any encoding system, since the keypoint features were not created by any encoding system for encoding information. The keypoint features may be small, for example, less than about 50 millimeters (mm), or 25, mm, or 20 mm, or 15, or 10 mm, or 5 mm in length or diameter.

At 210, the registration of the current image and the previous image is analyzed.

Optionally, the analysis includes computing a difference between the current image registered to the previous image. The difference may be computed for the overlapping regions of the current image and the previous image that are registered to one another. Non-overlapping regions and/or non-registered regions of the current image and previous image may be excluded. A value indicating the difference may be obtained, for example, the difference is computed between pixel intensity values, and the average and/or sum of the difference in pixel in intensity values is obtained. The registration may be defined (e.g., correct registration) when the difference (e.g., computed value indicating the difference) is below a threshold indicating likelihood of a match between the registered and/or overlapping. The threshold may be selected to account for temporary objects occluding the surface, for example, appearance of dust, sand, leaves, and junk on the surface between capture of the previous image and the current image. The threshold may be selected to indicate a good registration even in cases where such temporary objects appear.

Alternatively or additionally, the analysis of the registration includes computing a transformation between the current image and the previous image. The transformation may indicate a shift and/or offset of the current image relative to the previous image, for example, in a two dimensional (e.g., x,y) plane parallel to the surface. The transformation may be computed by considering parameters of the imaging sensor, for example, orientation and/or distance from the surface.

The transformation may be represented, for example, as a vector indicating a direction and displacement amount of the current image relative to the previous image.

At 212, the current location of the object is computed according to the analysis of the registration.

The current location may be computed relative to a reference location, for example, a zero origin (e.g. (0,0) coordinates) defined for a reference image, which may be for example, the first image captured in the sequence of images.

The current location may be computed by applying the transformation to the previously computed location determined for the previous image, for example, adding the shift and/or offset in the 2D plane to the previously computed coordinates.

The current location may be computed according to a conversion between pixels of the registered images and physical distances based on parameters of the imaging sensor.

At 214, the current location is provided. The current location may be fed into a controller of a vehicle for controlling movement of the vehicle. The current location may be presented on a display. The current location may be forwarded to a remote server, for example, for remote tracking of objects and/or remote navigation of objects. The current location may be forwarded to another process, for example, providing real time information to a driver of a car.

At 216, when the current location is provided to a controller, instructions for navigation of the object (e.g., vehicle) may be automatically generated.

The instructions may be, for example, code and/or other signals that automatically control movement of the vehicle, for example, automatically park the car in a parking spot, and automatically navigate a vacuum cleaning robot for covering an entire floor surface of an office.

The instructions may be, for example, audio and/or video and/or text instructions presented to a driver of the vehicle. For example, instructing the driver how to safely park in a dark and/or crowded parking spot without damaging the vehicle and/or nearby vehicles, such as "hard turn to the right", "reverse about 10 centimeters", and "turn the wheel to the left while slowly driving forward".

At 218, one or more features described with reference to 202-218 are dynamically iterated over multiple time intervals. During each iteration, new images are obtained and registered against previously obtained images. The dynamic iterations may enable real time localization of the object during motion, for example, for real time navigation of a vehicle and/or robot.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Figure 3:
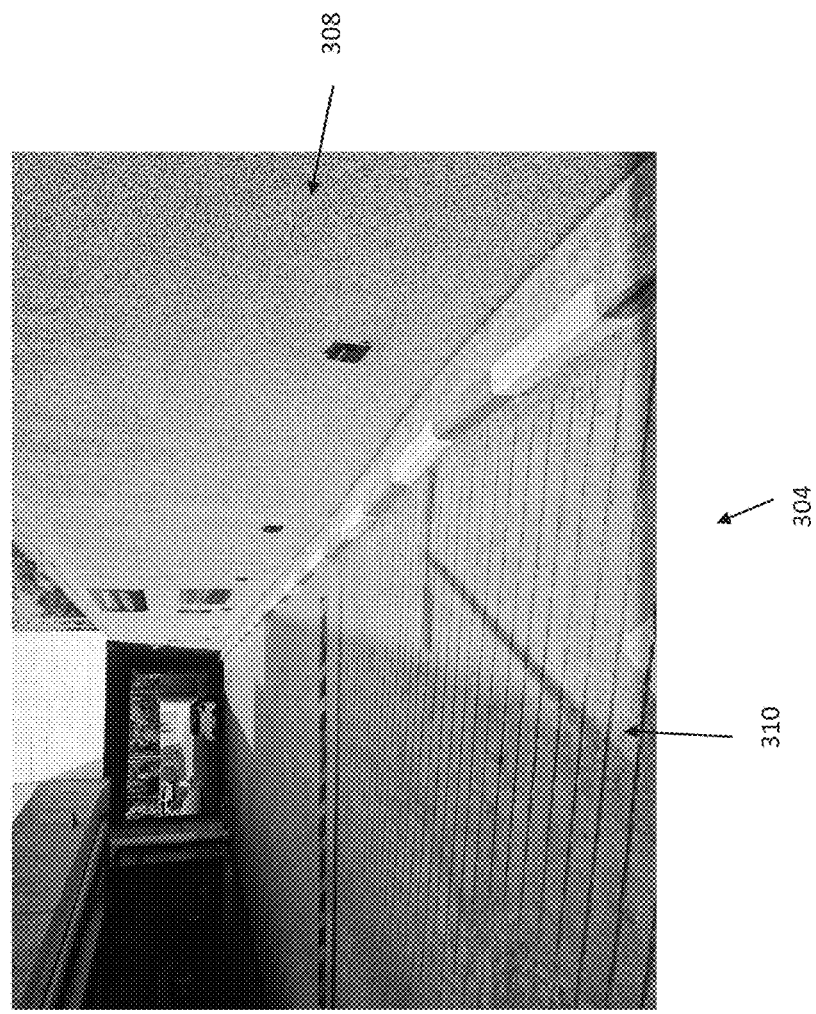
FIG. 3 includes schematics of an experimental setup by inventors for evaluating some embodiments of the present invention.
Figure 3:
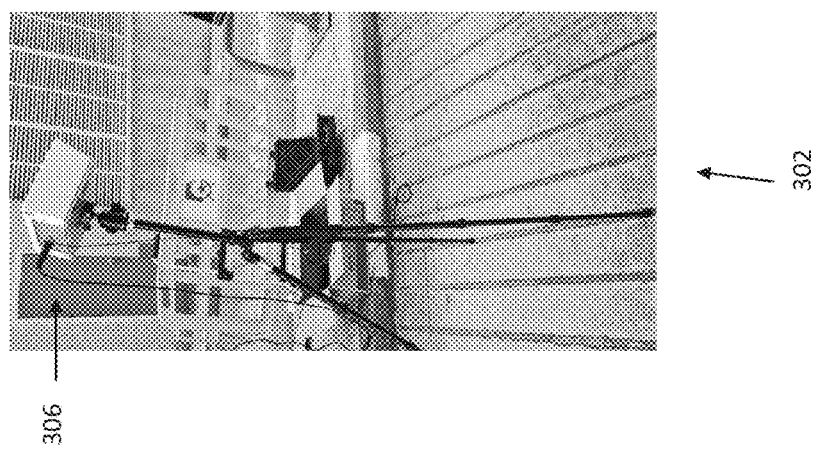

Reference is now made to FIG. 3, which includes schematics 302 and 304 of an experimental setup by inventors for evaluating some embodiments of the present invention. Schematic 302 depicts a SWIR camera and SWIR illumination source 306 in the solar blind range for capturing solar blind images. Schematic 304 depicts a surface 308 (i.e., wall) and a surface 310 (i.e., asphalt road) captured from a distance of about 2-3 meters by the SWIR camera under SWIR illumination in the solar blind range. The setup depicted in schematics 302 and 304 is designed to simulate a vehicle-mounted setup for capturing images of a wall and/or road while the vehicle is moving, for example, for dynamic navigation of the moving vehicle, as described herein.

Figure 4:
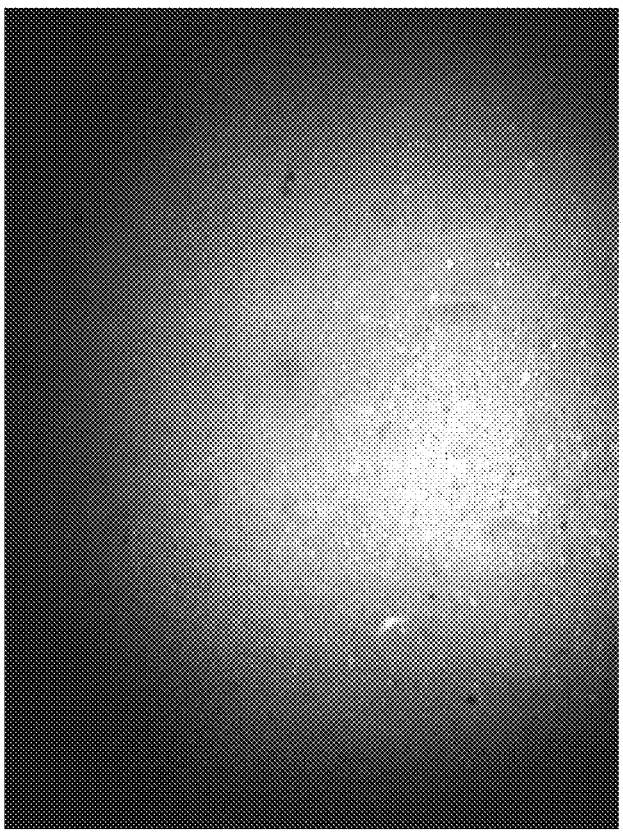
FIG. 4 includes a currently captured image and a previously captured image of an asphalt road obtained as part of the evaluation, in accordance with some embodiments of the present invention.
Figure 4:
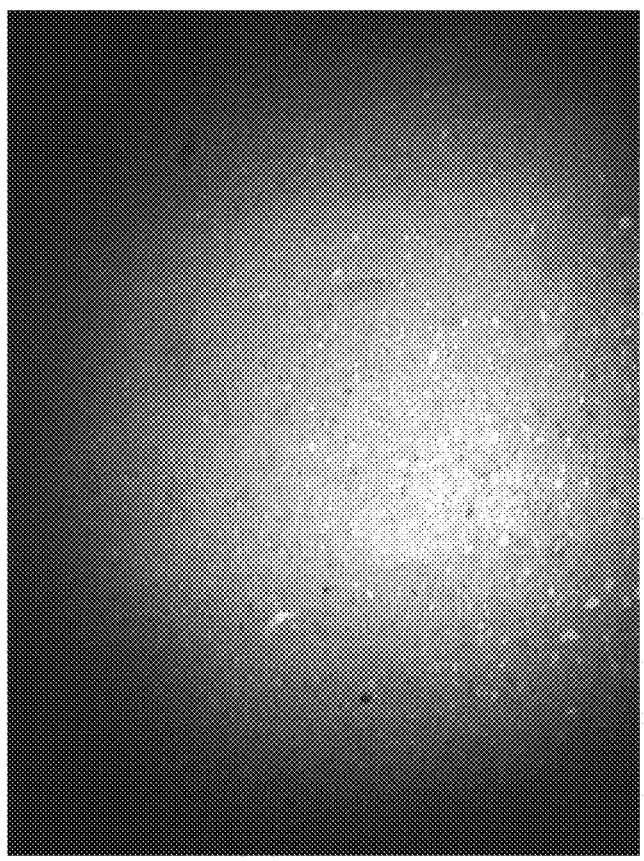

Reference is now made to FIG. 4, which includes a currently captured image 402 and a previously captured image 404 of asphalt road 310 (of FIG. 3) obtained as part of the evaluation, in accordance with some embodiments of the present invention. Images 402 and 404 of asphalt road 310 are captured by SWIR camera 306 under SWIR illumination, as described with reference to FIG. 3. Images 402 and 404 are captured by moving and/or rotating SWIR camera 306, for simulating motion of a vehicle over asphalt road 310, where the SWIR camera is installed on the vehicle.

Figure 5:
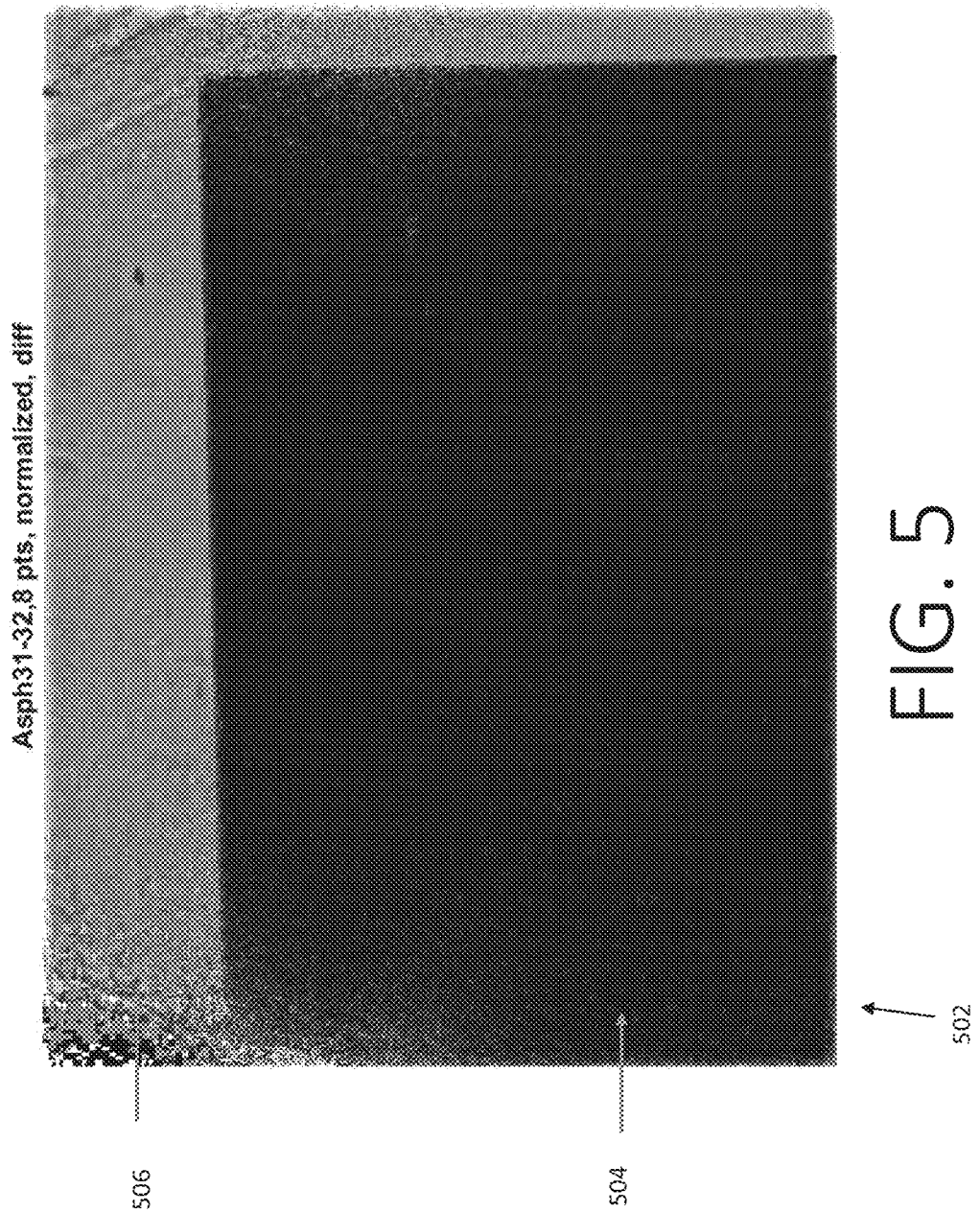
FIG. 5 is a schematic depicting a computed difference region for a registered overlapping region between the current and previously captured images of FIG. 4, in accordance with some embodiments of the present invention.

Reference is now made to FIG. 5, which is a schematic 502 depicting a computed difference region 504 for a registered overlapping region between images 402 and 404 of FIG. 4, in accordance with some embodiments of the present invention. It is noted that due to the motion between capture of images 402 and 404, non-overlapping and/or non-registered regions 506 are present. The registration was performed using a projective transformation. Light intensity was normalized on a local basis. The mostly dark difference region 504 indicates a very small difference between the overlapping regions of images 402 and 404, which is a good match, i.e., a good registration.

Figure 6:
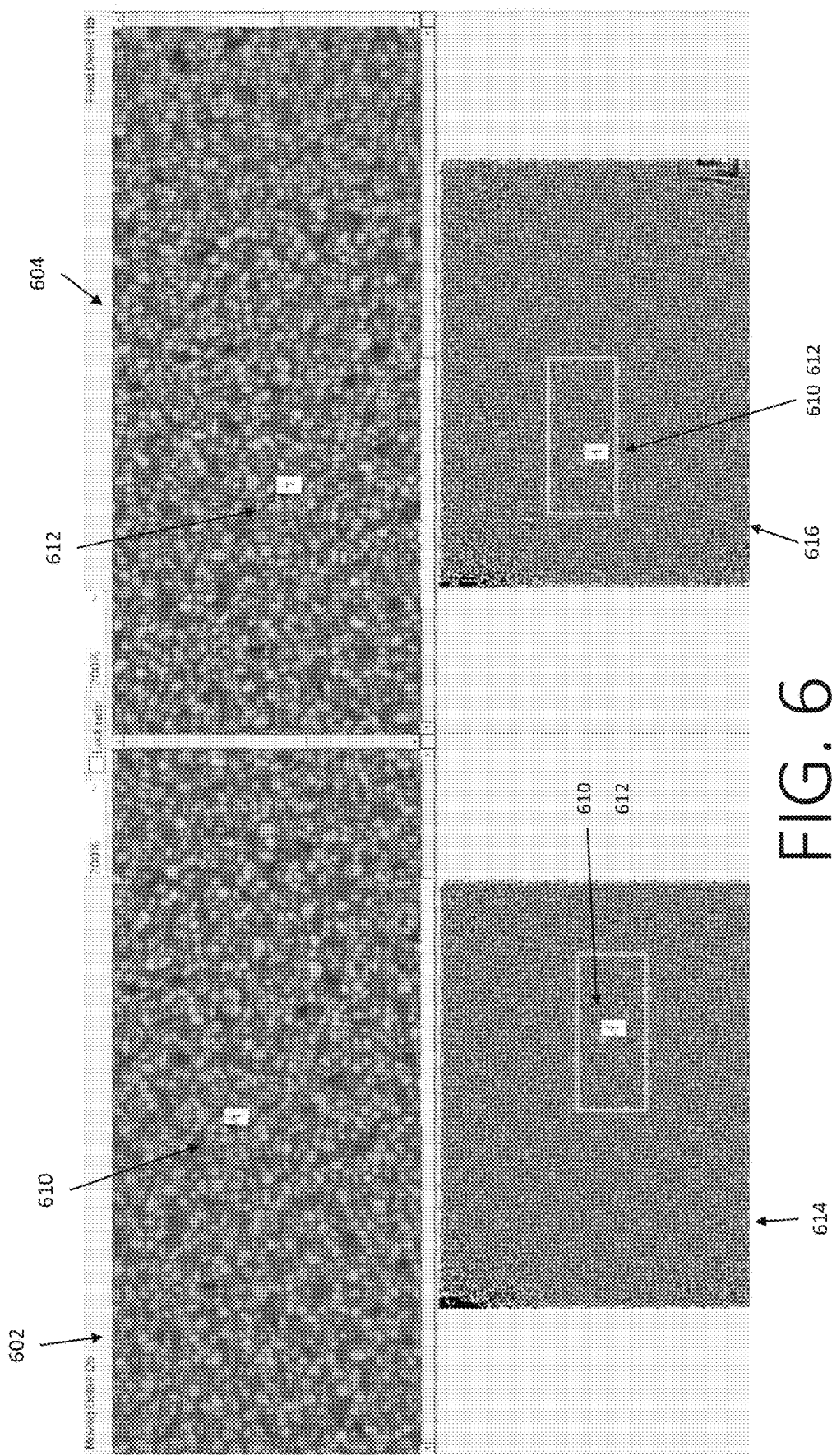
FIG. 6 includes a currently captured image and a previously captured image of a wall obtained as part of the evaluation, in accordance with some embodiments of the present invention.

Reference is now made to FIG. 6, which includes a currently captured image 602 and a previously captured image 604 of wall 308 (of FIG. 3) obtained as part of the evaluation, in accordance with some embodiments of the present invention. Images 602 and 604 of wall 308 are captured by SWIR camera 306 under SWIR illumination, as described with reference to FIG. 3. Images 602 and 604 are captured by moving and/or rotating SWIR camera 306, for simulating motion of a vehicle parallel to wall 308, where the SWIR camera is installed on the vehicle. A keypoint feature 610 is found in image 602, and matched to a corresponding keypoint feature 612 found in image 604. Schematics 614 and 616 depict registration between the overlapping regions of images 602 and 604, where the registration is performed using matching keypoint features 610 and 610.

Figure 7:
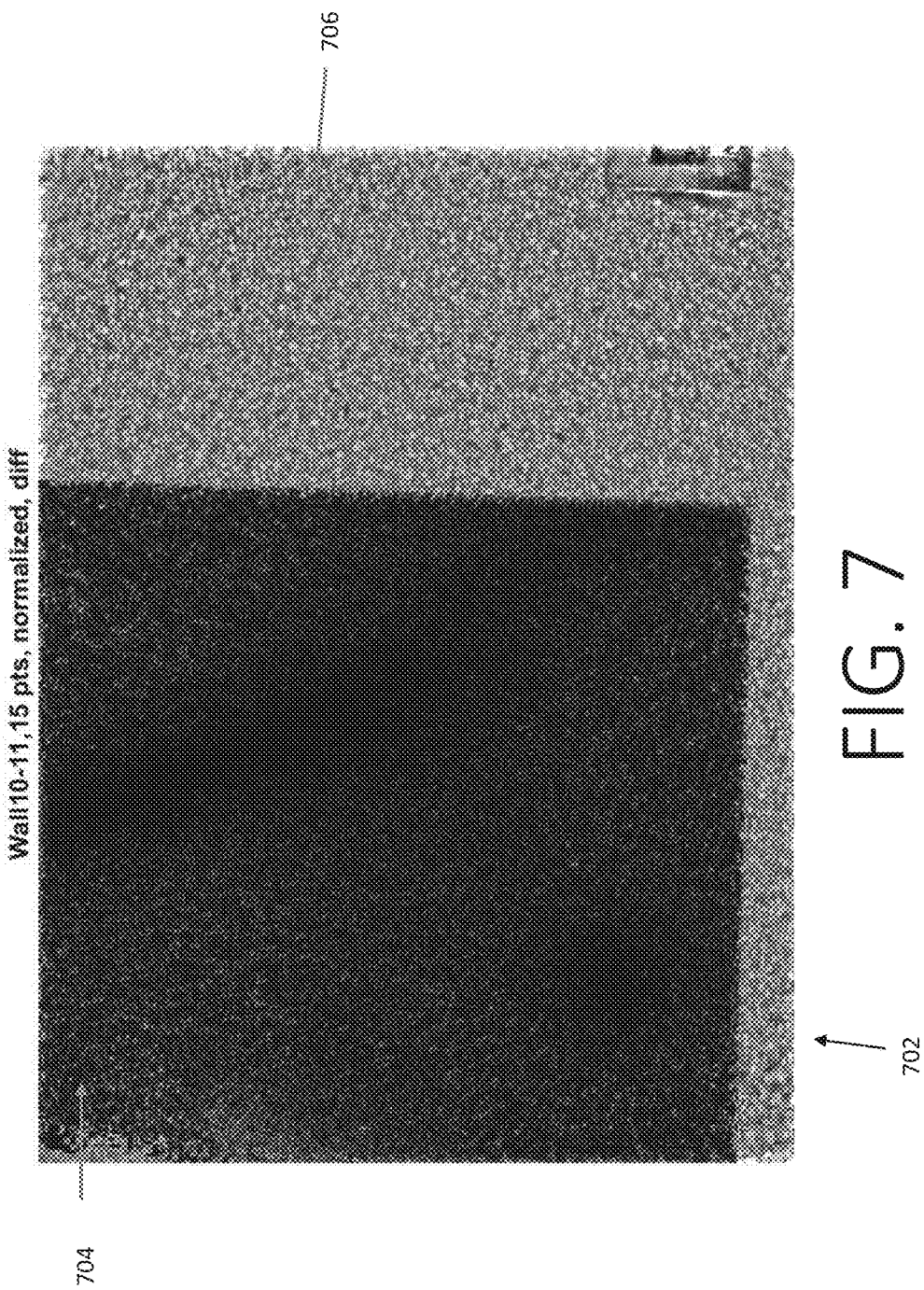
FIG. 7 is a schematic depicting a computed difference region for a registered overlapping region between the currently and previously captured images of FIG. 6, in accordance with some embodiments of the present invention.

Reference is now made to FIG. 7, which is a schematic 702 depicting a computed difference region 704 for a registered overlapping region between images 602 and 604 of FIG. 6, in accordance with some embodiments of the present invention. It is noted that due to the motion between capture of images 602 and 604, non-overlapping and/or non-registered regions 706 are present. The registration was performed using matching keypoints appearing in both images 602 and 604, for example, keypoints 610 and 612 described with reference to FIG. 6. The registration was performed using a projective transformation. Light intensity was normalized on a local basis. The mostly dark difference region 704 indicates a very small difference between the overlapping regions of images 602 and 604, which is a good match, i.e., a good registration.

Figure 8:
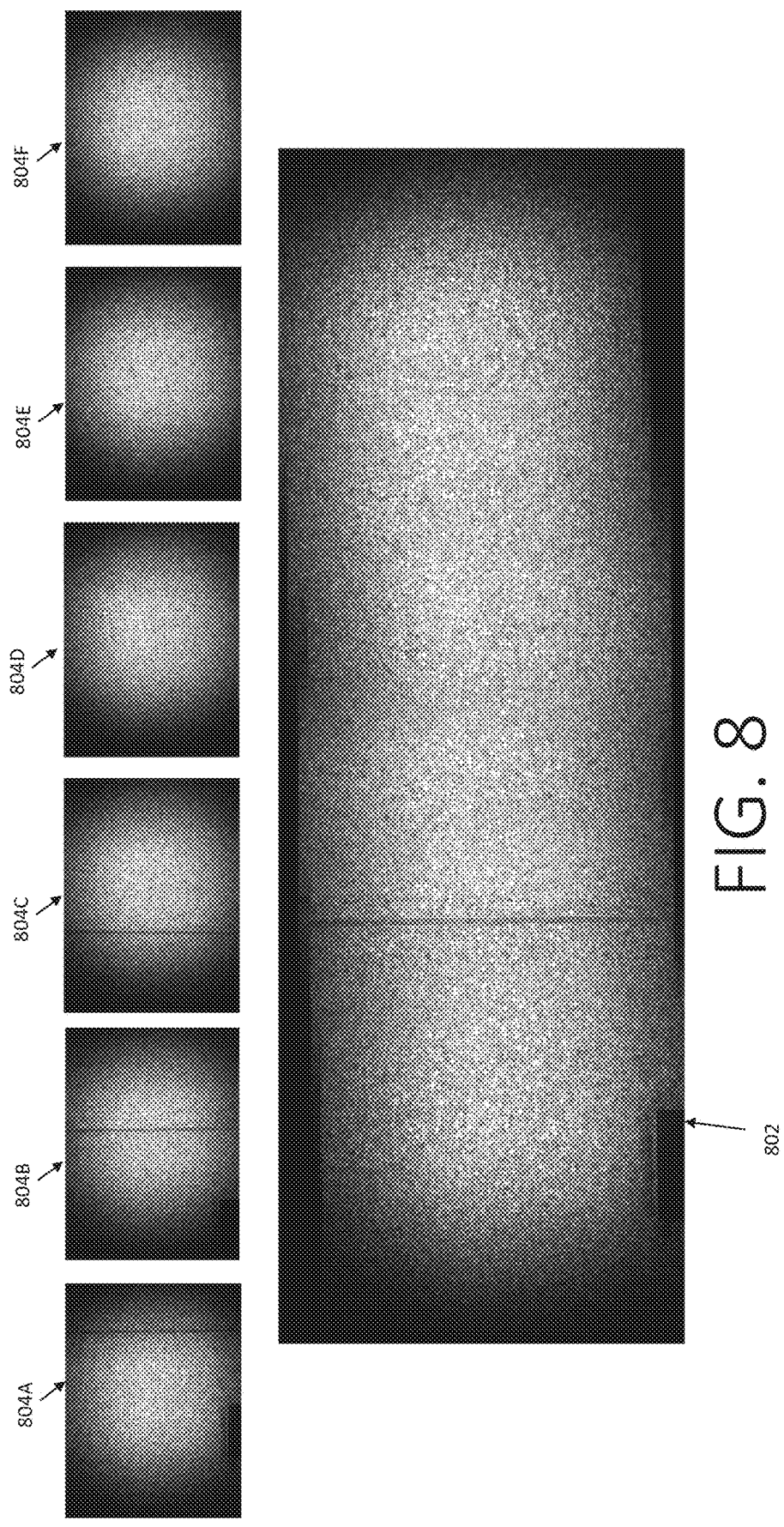
FIG. 8 is a schematic depicting an image of a wall created by stitching sequentially captured images, in accordance with some embodiments of the present invention.

Reference is now made to FIG. 8, which is a schematic 802 depicting an image of wall 308 (of FIG. 3) created by stitching sequentially captured images 804A-F, in accordance with some embodiments of the present invention. Images 804A-F may be captured by a camera located on a vehicle during motion of the vehicle along the wall. Schematic 802 may be used for computing the current location of the vehicle, for example, for real time control of movement and/or navigation of the vehicle, as described herein.

Reference is now made to FIG. 9, which is a schematic 902 depicting an image of road 310 (of FIG. 3) created by stitching sequentially captured images 904A-H, in accordance with some embodiments of the present invention. Images 904A-H may be captured by a camera located on a vehicle during motion of the vehicle driving over the road. Schematic 902 may be used for computing the current location of the vehicle, for example, for real time control of movement and/or navigation of the vehicle, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant imaging sensors will be developed and the scope of the term imaging sensor is intended to include all such new technologies a priori.

As used herein the term "about" refers to ± 10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of controlling movement of an object, comprising:
   accessing a current image of a surface relative to an object at a current location,
   wherein an imaging sensor is set to capture the current image depicting an overlap with a previously captured image of the surface when the object was at a previous location;
   registering the current image to the overlap of the previously captured image;
   computing the current location of the object relative to a reference location according to an analysis of the registration; and
   feeding the current location into a controller for controlling movement of the object;
   activating an electromagnetic illumination source at a selected illumination pattern for generating electromagnetic illumination for providing visibility of the surface depicted in images, wherein the images are captured by an imaging sensor at the electromagnetic spectrum of the electromagnetic illumination;
   wherein the electromagnetic illumination source generates electromagnetic illumination at the short wave infrared (SWIR) range, and the imaging sensor comprises a SWIR sensor;
   wherein the SWIR range comprises a solar blind range.

2. The computer implemented method of claim 1, wherein the current location is computed according to a conversion between pixels of the registered images and physical distances based on parameters of the imaging sensor.

3. The computer implemented method of claim 1, wherein registering further comprising computing a difference between the current image registered to the previous image, and defining the registration when the difference is below a threshold indicating likelihood of a match, wherein the threshold is selected to account for temporary objects occluding the surface.

4. The computer implemented method of claim 1, further comprising computing a transformation between the current image and the previous image, wherein the location is computed based on the transformation and location and/or orientation of the imaging sensor.

5. The computer implemented method of claim 1, wherein the imaging sensor is installed on the object and set for capturing images of the surface over which the object is moving.

6. The computer implemented method of claim 1, wherein the accessing, the registering, the computing, and the feeding, are iterated dynamically while the object is in motion over a plurality of time intervals using subsequently obtained new current images using preceding obtained images.

7. A computer implemented method of controlling movement of an object, comprising:
   accessing a current image of a surface relative to an object at a current location,
   wherein an imaging sensor is set to capture the current image depicting an overlap with a previously captured image of the surface when the object was at a previous location;
   registering the current image to the overlap of the previously captured image;
   computing the current location of the object relative to a reference location according to an analysis of the registration; and
   feeding the current location into a controller for controlling movement of the object;
   wherein registering comprises extracting a current spatial pattern of a plurality of keypoint features from the current image, and matching the current spatial pattern to a previously extracted spatial pattern of a plurality of keypoint features extracted from the previously captured image.

8. The computer implemented method of claim 7, wherein the object is selected from a group comprising: a vehicle, a robot, an autonomous car, and a drone.

9. The computer implemented method of claim 7, further comprising activating an electromagnetic illumination source at a selected illumination pattern for generating electromagnetic illumination for providing visibility of the surface depicted in images, wherein the images are captured by an imaging sensor at the electromagnetic spectrum of the electromagnetic illumination.

10. The computer implemented method of claim 9, wherein the electromagnetic illumination source generates electromagnetic illumination at the short wave infrared (SWIR) range, and the imaging sensor comprises a SWIR sensor.

11. The computer implemented method of claim 7, wherein the plurality of keypoint features are non-encoding features that are textural features of the surface.

12. The computer implemented method of claim 11, wherein the textural features are of a surface selected from a group comprising: asphalt, concrete, marble, wood, earth, and rough paint.

13. The computer implemented method of claim 7, wherein the plurality of keypoint features are randomly arranged.

14. The computer implemented method of claim 7, wherein the plurality of keypoint features are similar to one another.

15. The computer implemented method of claim 7, wherein the plurality of keypoint features are less than about 10 millimeters in length or diameter.

16. A system for controlling movement of an object, comprising:
at least one processor executing a code for:
accessing a current image of a surface relative to an object at a current location,
wherein an imaging sensor is set to capture the current image depicting an overlap with a previously captured image of the surface when the object was at a previous location;
registering the current image to the overlap of the previously captured image;
computing the current location of the object relative to a reference location according to an analysis of the registration; and
feeding the current location into a controller for controlling movement of the object;
wherein registering comprises extracting a current spatial pattern of a plurality of keypoint features from the current image, and matching the current spatial pattern to a previously extracted spatial pattern of a plurality of keypoint features extracted from the previously captured image.

17. A non-transitory medium storing program instructions for controlling movement of an object, which, when executed by at least one processor, cause the at least one processor to:
access a current image of a surface relative to an object at a current location,
wherein an imaging sensor is set to capture the current image depicting an overlap with a previously captured image of the surface when the object was at a previous location;
register the current image to the overlap of the previously captured image;
compute the current location of the object relative to a reference location according to an analysis of the registration; and
feed the current location into a controller for controlling movement of the object;
wherein registering comprises extracting a current spatial pattern of a plurality of keypoint features from the current image, and matching the current spatial pattern to a previously extracted spatial pattern of a plurality of keypoint features extracted from the previously captured image.

* * * * *